United States Patent
Adam et al.

(10) Patent No.: US 10,627,827 B2
(45) Date of Patent: Apr. 21, 2020

(54) METHOD FOR MAINTAINING DESIRED LANE BY AUTONOMOUS VEHICLE IN ENVIRONMENTS WITH COMPROMISED LANE MARKERS

(71) Applicant: GM Global Technology Operations LLC, Detroit, MI (US)

(72) Inventors: Paul A. Adam, Milford, MI (US); Donovan J. Wisner, Ann Arbor, MI (US); Assaad Krichene, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 80 days.

(21) Appl. No.: 15/987,020

(22) Filed: May 23, 2018

(65) Prior Publication Data

US 2019/0361459 A1  Nov. 28, 2019

(51) Int. Cl.
*G05D 1/02* (2020.01)
*G05D 1/00* (2006.01)

(52) U.S. Cl.
CPC ......... *G05D 1/0236* (2013.01); *G05D 1/0088* (2013.01); *G05D 1/0246* (2013.01)

(58) Field of Classification Search
CPC ... G05D 1/0236; G05D 1/0088; G05D 1/0246
See application file for complete search history.

(56) References Cited

U.S. PATENT DOCUMENTS

| 2018/0286247 A1* | 10/2018 | Fujita | G08G 1/167 |
| 2019/0096258 A1* | 3/2019 | Ide | B62D 15/0255 |
| 2019/0113355 A1* | 4/2019 | Yeung | G01C 21/3492 |

* cited by examiner

*Primary Examiner* — Jess Whittington
*Assistant Examiner* — Brian E Yang
(74) *Attorney, Agent, or Firm* — Quinn IP Law

(57) ABSTRACT

A method of controlling a vehicle includes sensing a first boundary lane indicator and a second boundary lane indicator of an adjacent traffic lane, which is laterally offset from a current traffic lane of the vehicle. The first boundary lane indicator, the second boundary lane indicator, and/or a centerline of the adjacent traffic lane, may be transposed onto the current traffic lane of the vehicle, and used to maneuver the vehicle in order to maintain a position of the vehicle within the current traffic lane, when a left boundary lane indicator and/or a right boundary lane indicator of the current traffic lane is determined to be an unsatisfactory delineator of the current traffic lane.

19 Claims, 2 Drawing Sheets

METHOD FOR MAINTAINING DESIRED LANE BY AUTONOMOUS VEHICLE IN ENVIRONMENTS WITH COMPROMISED LANE MARKERS

INTRODUCTION

The disclosure generally relates to a method of controlling a vehicle.

Autonomous vehicles include sensors operable to sense the environment surrounding the vehicle, and a computing device that is operable to control all aspects of vehicle operation. Semi-autonomous vehicles operate in a similar manner, but may require some operator input, oversight, and/or control. One of the control functions that autonomous and semi-autonomous vehicles perform includes maintaining the position of the vehicle within a current traffic lane while traveling along a roadway. The vehicle sensors and the computing device operate to identify lane boundary indicators for the current traffic lane that the vehicle is traveling along, and maneuver the vehicle to maintain the vehicle within the current traffic lane. The lane boundary indicators may include, for example, pavement markings such as yellow or white painted lines, an edge of pavement, a barrier wall, etc. This process requires that the sensors and the computing device be able to accurately identify the boundary lane indicators, and that the boundary lane indicators are accurate and provide a satisfactory delineator of the edge of the current traffic lane. If the boundary lane indicators are unsatisfactory or are unable to be sensed or identified by the vehicle, then the vehicle is unable to determine the extents of the current traffic lane, and may need to transition control to the operator.

SUMMARY

A method of controlling a vehicle is provided. The method includes sensing a first boundary lane indicator and a second boundary lane indicator of an adjacent traffic lane. The first boundary lane indicator and the second boundary lane indicator are sensed with at least one sensor of the vehicle. The adjacent traffic lane is laterally offset from a current traffic lane of the vehicle. A computing device of the vehicle maneuvers the vehicle to maintain a position of the vehicle within the current traffic lane, based on the sensed first boundary lane indicator and the sensed second boundary lane indicator of the adjacent traffic lane.

In one aspect of the method of controlling the vehicle, the computing device uses the sensors of the vehicle to sense a left boundary lane indicator and a right boundary lane indicator of the current traffic lane. The computing device determines if both of the left boundary lane indicator and the right boundary lane indicator of the current traffic lane are satisfactory delineators of the current traffic lane, or if at least one of the left boundary lane indicator and the right boundary lane indicator of the current traffic lane is an unsatisfactory delineator of the current traffic lane. When the computing device determines that at least one of the left boundary lane indicator and the right boundary lane indicator of the current traffic lane is an unsatisfactory delineator of the current traffic lane, then the computing device uses the first boundary lane indicator and the second boundary lane indicator of the adjacent traffic lane to control the position of the vehicle within the current traffic lane. When the computing device determines that both of the left boundary lane indicator and the right boundary lane indicator of the current traffic lane are satisfactory delineators of the current traffic lane, then the computing device uses the left boundary lane indicator and the right boundary line indicator of the current traffic lane to control the position of the vehicle within the current traffic lane.

In another aspect of the method of controlling the vehicle, the computing device may transpose the first boundary lane indicator of the adjacent traffic lane onto the current traffic lane to define a transposed left edge of the current traffic lane. Similarly, the computing device may transpose the second boundary lane indicator of the adjacent traffic lane onto the current traffic lane to define a transposed right edge of the current traffic lane. The computing device may then calculate a transposed centerline of the current traffic lane, which is disposed approximately midway between the transposed left edge of the current traffic lane and the transposed right edge of the current traffic lane. The computing device may then control the vehicle in order to maneuver the vehicle in order to follow the transposed centerline of the current traffic lane. In another embodiment, the computing device may maneuver the vehicle so that the vehicle does not cross either of the transposed left edge of the current traffic lane or the transposed right edge of the current traffic lane.

In another aspect of the method of controlling the vehicle, the computing device may calculate an actual centerline of the adjacent traffic lane. The actual centerline of the adjacent traffic lane is disposed approximately midway between the first boundary lane indicator and the second boundary lane indicator. The computing device may then transpose the actual centerline of the adjacent traffic lane onto the current traffic lane to define a transposed centerline of the current traffic lane. The computing device may then control the vehicle in order to maneuver the vehicle in order to follow the transposed centerline of the current traffic lane.

In one aspect of the method of controlling the vehicle, the at least one sensor of the vehicle includes at least one of a Light Detection and Ranging (LIDAR) sensor or a camera.

In another aspect of the method of controlling the vehicle, the computing device may compare the first boundary lane indicator and the second boundary lane indicator to map data representing the adjacent traffic lane and the current traffic lane, in order to identify a relative position between the adjacent traffic lane and the current traffic lane, and determine the accuracy of the first boundary lane indicator and/or the second boundary lane indicator. The map data may be stored in a memory of the computing device, or may be accessed via a wireless connection to a remote location.

In another aspect of the method of controlling the vehicle, the computing device may compare the transposed centerline of the current traffic lane to a current travel path of the vehicle to determine if the transposed centerline of the current traffic lane and the current travel path of the vehicle are generally aligned. If the transposed centerline of the current traffic lane and the current travel path of the vehicle are not generally aligned, then the computing device may transfer control of the vehicle to an operator, and not maneuver the vehicle to follow the transposed centerline of the current traffic lane.

A vehicle is also provided. The vehicle includes at least one sensor that is operable to sense boundary lane indicators of a current traffic lane and an adjacent traffic lane of the vehicle. The adjacent traffic lane is laterally offset from the current traffic lane of the vehicle. A computing device is disposed in communication with the at least one sensor for receiving data related to the sensed boundary lane indicators for the current traffic lane and the adjacent traffic lane. The computing device includes a processor and a memory having a lane boundary determination algorithm stored therein.

The processor is operable to execute the lane boundary determination algorithm to sense a first boundary lane indicator and a second boundary lane indicator of the adjacent traffic lane, and maneuver the vehicle to maintain a position of the vehicle within the current traffic lane, based on the sensed first boundary lane indicator and the sensed second boundary lane indicator of the adjacent traffic lane.

In one aspect of the vehicle, the processor is operable to execute the lane boundary determination algorithm to sense a left boundary lane indicator and a right boundary lane indicator of the current traffic lane of the vehicle. The lane boundary determination algorithm may then determine that both of the left boundary lane indicator and the right boundary lane indicator of the current traffic lane are satisfactory delineators of the current traffic lane, or may determine that at least one of the left boundary lane indicator and the right boundary lane indicator of the current traffic lane is an unsatisfactory delineator of the current traffic lane. When at least one of the left boundary lane indicator and the right boundary lane indicator of the current traffic lane is determined to be an unsatisfactory delineator of the current traffic lane, then the lane boundary determination algorithm maneuvers the vehicle to maintain the position of the vehicle within the current traffic lane, based on the sensed first boundary lane indicator and the sensed second boundary lane indicator of the adjacent traffic lane.

When both of the left boundary lane indicator and the right boundary lane indicator of the current traffic lane are determined to be satisfactory delineators of the current traffic lane, then the lane boundary determination algorithm maneuvers the vehicle to maintain the position of the vehicle within the current traffic lane, based on the left boundary lane indicator and the right boundary lane indicator of the current traffic lane.

In another aspect of the vehicle, the processor is operable to execute the lane boundary determination algorithm to transpose the first boundary lane indicator of the adjacent traffic lane onto the current traffic lane to define a transposed left edge of the current traffic lane, and transpose the second boundary lane indicator of the adjacent traffic lane onto the current traffic lane to define a transposed right edge of the current traffic lane. The lane boundary determination algorithm may then maneuver the vehicle to prevent the vehicle from crossing either of the transposed right edge or the transposed left edge of the current traffic lane. Alternatively, the lane boundary determination algorithm may calculate a transposed centerline of the current traffic lane disposed between the transposed left edge of the current traffic lane and the transposed right edge of the current traffic lane, and maneuver the vehicle to follow the transposed centerline of the current traffic lane.

Accordingly, the method described herein enables semi-autonomous or fully autonomous operation of the vehicle when the boundary lane indicators for the current traffic lane are not present, not capable of being sensed by the sensors of the vehicle, and/or are unsatisfactory delineators of the current traffic lane, by using the boundary lane indicators of an adjacent traffic lane. If the vehicle is able to sense the boundary lane indicators of the adjacent traffic lane, the computing device of the vehicle may transpose those boundary line indicators or a centerline of the adjacent traffic lane onto the current traffic lane, and use those transposed edge lines as a basis for controlling the vehicle until the right and left boundary line indicators of the current traffic lane once again become satisfactory delineators of the current traffic lane.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
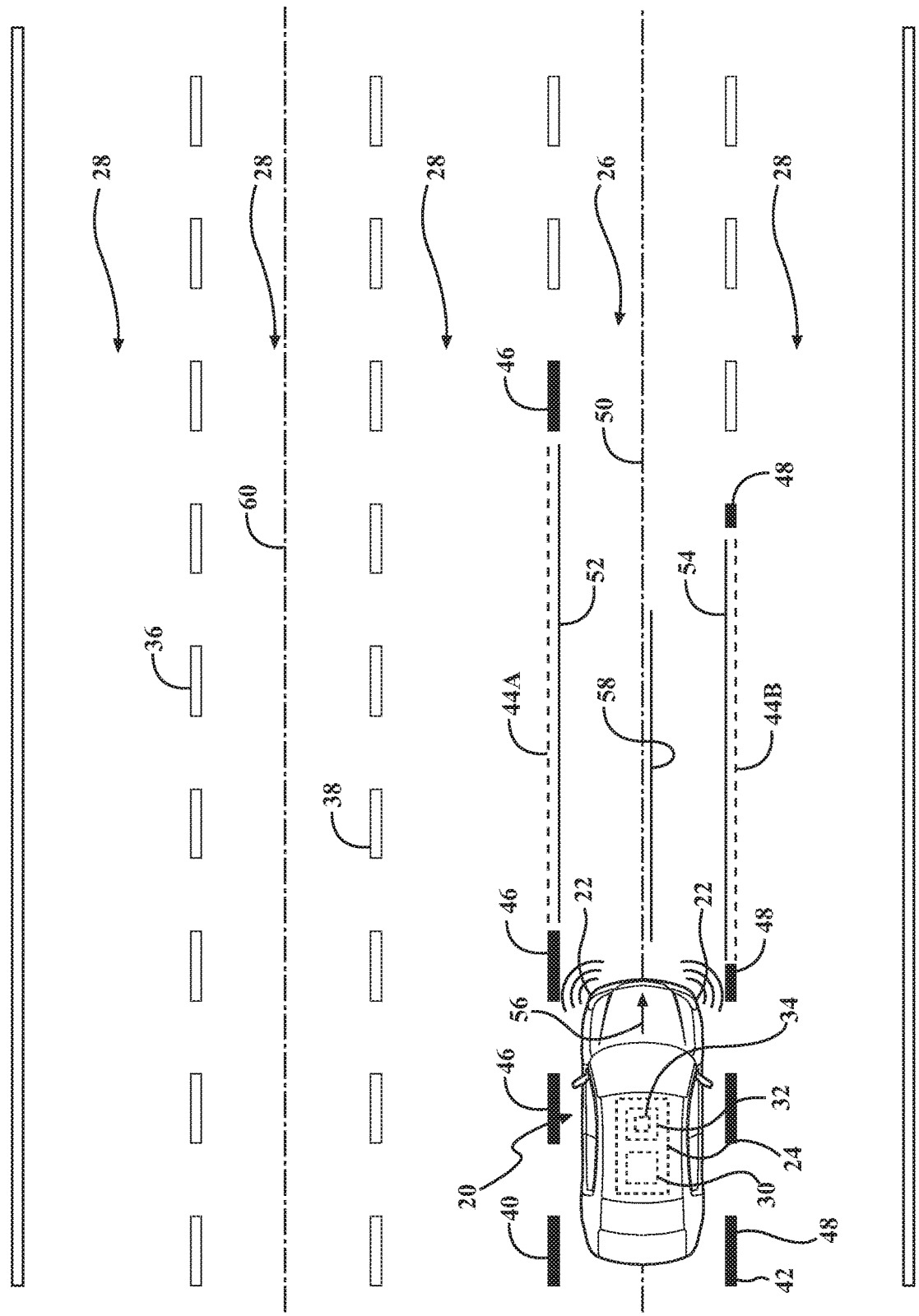
FIG. 1 is a schematic plan view of a vehicle on a roadway.

Referring to the FIGS., wherein like numerals indicate like parts throughout the several views, a vehicle is generally shown at 20 in FIG. 1. The vehicle 20 may include a type of moveable platform, such as but not limited to a car, truck, motorcycle, van, etc. The vehicle 20 includes at least one sensor 22 and a computing device 24 that cooperate together to at least partially control and maneuver the vehicle 20 during certain situations. As such, the vehicle 20 may be referred to as a semi-autonomous or a fully autonomous vehicle 20.

Referring to FIG. 1, the sensors 22 of the vehicle 20 are operable to sense boundary lane indicators of both a current traffic lane 26 and an adjacent traffic lane 28 of the vehicle 20. As used herein, the term "current traffic lane 26" of the vehicle 20 is the lane in which the vehicle 20 is currently traveling. As used herein, the term "adjacent traffic lane 28" of the vehicle 20 includes a traffic lane that is generally parallel to and is laterally offset from the current traffic lane 26 of the vehicle 20. The adjacent traffic lane 28 may include a lane that is immediately adjacent to the current traffic lane 26 of the vehicle 20, i.e., the next lane over. Alternatively, the adjacent traffic lane 28 may include a lane that is separated from the current traffic lane 26 of the vehicle 20 by one or more other lanes. As such, it should be appreciated that the vehicle 20 may be capable of identifying multiple adjacent traffic lanes 28, depending upon the configuration of the roadway. FIG. 1 shows three adjacent traffic lanes 28.

The sensors 22 of the vehicle 20 may include, but are not limited to, at least one of a Light Detection and Ranging (LIDAR) sensor or a camera. It should be appreciated that other types of sensors 22 may be used to detect, sense, and/or identify the boundary lane indicators of the current traffic lane 26 and the adjacent traffic lane 28. The boundary lane indicators may include, but are not limited to, an edge of pavement, yellow paint lines, white paint lines, barriers, guardrails, etc. The vehicle 20 may include a number and/or type of sensors 22 located around the vehicle 20 to detect the boundary lane indicators. The type of sensors 22, their location on the vehicle 20, and their operation for detecting and/or sensing the boundary lane indicators are understood by those skilled in the art, are not pertinent to the teachings of this disclosure, and are therefore not described in detail herein.

The computing device 24 is disposed in communication with the sensors 22 of the vehicle 20 for receiving their respective sensed data related to the detection or sensing of the boundary lane indicators. The computing device 24 may alternatively be referred to as a control module, a control unit, a controller, a vehicle 20 controller, a computer, etc. The computing device 24 may include a computer and/or processor 30, and include software, hardware, memory, algorithms, connections, sensors 22, etc., for managing and controlling the operation of the vehicle 20. As such, a method, described below and generally represented in FIG. 2, may be embodied as a program or algorithm operable on the computing device 24. It should be appreciated that the computing device 24 may include a device capable of analyzing data from the sensors 22, comparing data, making the decisions required to control the operation of the vehicle 20, and executing the required tasks to control the operation of the vehicle 20.

The computing device 24 may be embodied as one or multiple digital computers or host machines each having one or more processors 30, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics.

The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

The controller includes a tangible, non-transitory memory 32 on which are recorded computer-executable instructions, including a lane boundary determination algorithm 34. The processor 30 of the controller is configured for executing the lane boundary determination algorithm 34. The lane boundary determination implements a method of controlling the vehicle 20 when the lane boundary indicators of the current traffic lane 26 are either not identifiable, or include unsatisfactory quality for controlling the vehicle 20.

The method of controlling the vehicle 20 includes sensing a first boundary lane indicator 36 and a second boundary lane indicator 38 of the adjacent traffic lane 28. The step of sensing the first boundary lane indicator 36 and the second boundary lane indicator 38 is generally indicated by box 120 in FIG. 2. While FIG. 1 shows the first boundary lane indicator 36 and the second boundary lane indicator 38 for one of the possible adjacent lanes, it should be appreciated that each of the respective adjacent traffic lanes 28 have a respective first boundary lane indicator 36 and a second boundary lane indicator 38, and that the computing device 24 may sense the first boundary lane indicator 36 and the second boundary lane indicator 38 for more than the exemplary adjacent traffic lane 28 shown in FIG. 1 and described herein. The first boundary lane indicator 36 and the second boundary lane indicator 38 are sensed using the sensors 22 of the vehicle 20, as described above. The first boundary lane indicator 36 may be considered a left edge indicator of the adjacent traffic lane 28, and the second boundary lane indicator 38 may be considered a right edge indicator of the adjacent traffic lane 28. As noted above, the boundary lane indicators 36, 38 of the adjacent traffic lane 28 may include, but are not limited to, an edge of pavement, yellow paint lines, white paint lines, barriers, guardrails, etc.

The computing device 24 and the sensors 22 of the vehicle 20 further sense and/or identify a left boundary lane indicator 40 and a right boundary lane indicator 42 of the current traffic lane 26. The step of sensing the left boundary lane indicator 40 and the right boundary lane indicator 42 is generally indicated by box 120 in FIG. 2. The boundary lane indicators of the current traffic lane 26 may include, but are not limited to, an edge of pavement, yellow paint lines, white paint lines, barriers, guardrails, etc. It should be appreciated that for immediately adjacent lanes of a roadway, that one of the left boundary lane indicator 40 and the right boundary lane indicator 42 of the current traffic lane 26 may be the same as one of the first boundary lane indicator 36 and the second boundary lane indicator 38 of the adjacent traffic lane 28. However, for traffic lanes that are separated by some distance, or separated by other traffic lanes, that the left boundary lane indicator 40 and the right boundary lane indicator 42 of the current traffic lane 26 are separate and distinct from the first boundary lane indicator 36 and the second boundary lane indicator 38 of the adjacent traffic lane 28.

The computing device 24 evaluates the left boundary lane indicator 40 and the right boundary lane indicator 42 of the current traffic lane 26 to determine if both of the left boundary lane indicator 40 and the right boundary lane indicator 42 of the current traffic lane 26 are satisfactory delineators of the current traffic lane 26, or if at least one of the left boundary lane indicator 40 and the right boundary lane indicator 42 of the current traffic lane 26 is an unsatisfactory delineator of the current traffic lane 26. The step of determining if the left boundary lane indicator 40 and the right boundary lane indicator 42 of the current traffic lane 26 are both satisfactory delineators is generally represented by box 122 in FIG. 2. As used herein, the term "satisfactory delineator" is defined as a boundary lane indicator that is capable of being sensed, detected, or identified by the computing device 24, or a boundary lane indicator that is continuous and suitable to use as a basis for controlling the vehicle 20. As used herein, the term "unsatisfactory delineator" is defined as a boundary lane indicator that is not capable of being sensed, detected, or identified by the computing device 24, or a boundary lane indicator that is too erratic or otherwise untrustworthy to use as a basis for controlling the vehicle 20. Referring to FIG. 1, unsatisfactory sections of the left boundary lane indicator 40 and the right boundary lane indicator 42 are generally represented by the phantom line segments 44A and 44B respectively. The boundary lane indicators may be found to be unsatisfactory delineators because they have been worn away, are blocked by other vehicles, are covered with snow, dirt, or other debris, or exhibits multiple rapid laterally changes in direction that fails to consistently define a linear edge.

Figure 2:
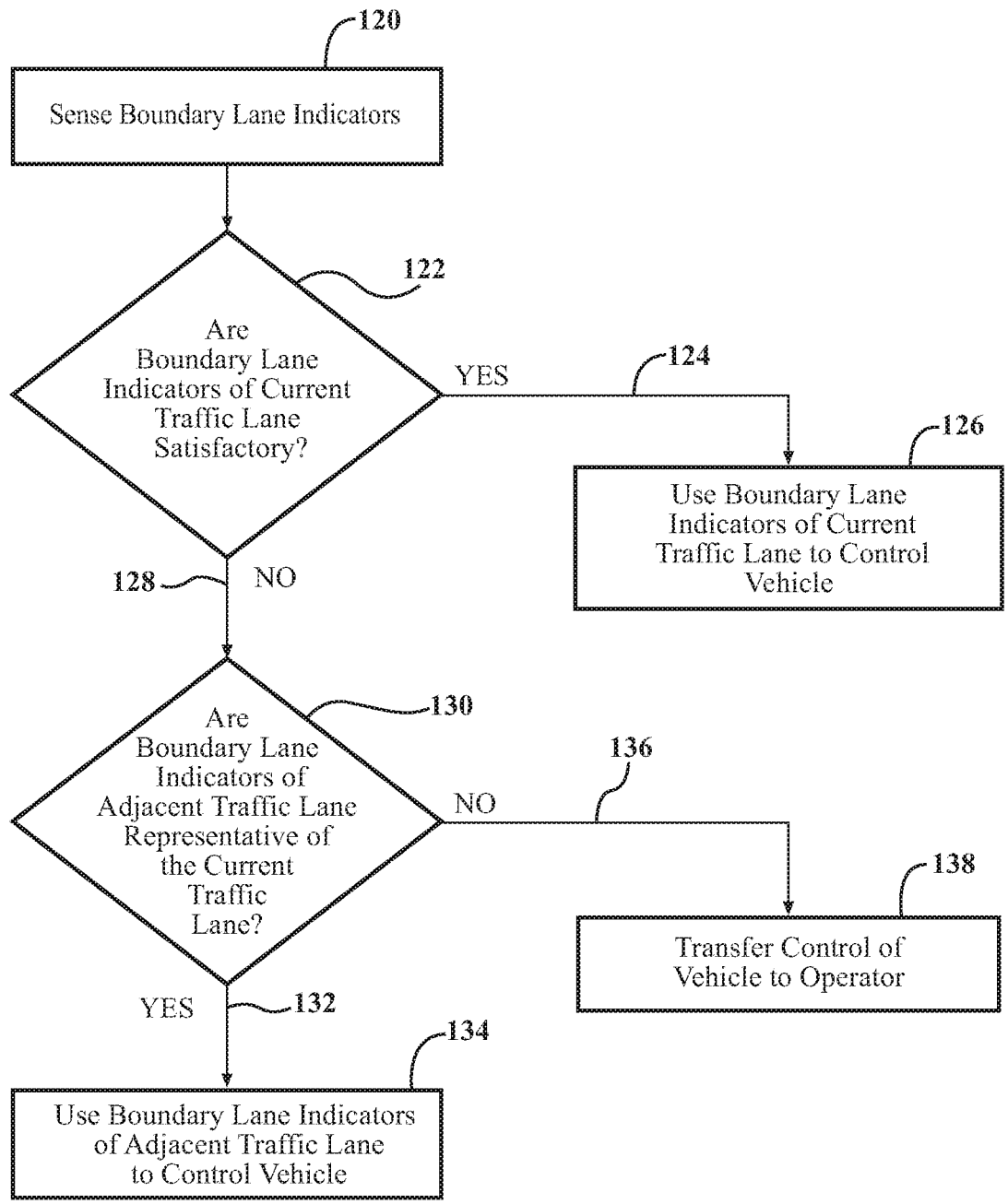
FIG. 2 is a flowchart representing a method of controlling the vehicle.

When the computing device 24 determines that both of the left boundary lane indicator 40 and the right boundary lane indicator 42 of the current traffic lane 26 are satisfactory delineators, generally indicated at 124 in FIG. 2 and generally represented by the darkened line segments 46 and 48 of the current traffic lane 26 in FIG. 1, then the computing device 24 uses the left boundary lane indicator 40 and the right boundary lane indicator 42 of the current traffic lane 26 in order to control and maneuver the vehicle 20 to maintain a position of the vehicle 20 within the current traffic lane 26. The step of using the left boundary lane indicator 40 and the right boundary lane indicator 42 of the current traffic lane 26 to control the vehicle 20 is generally indicated by box 126 in FIG. 2. The computing device 24 may use the left boundary lane indicator 40 and the right boundary lane indicator 42 of the current traffic lane 26 as the basis for maneuvering the vehicle 20 in a suitable manner. For example, the computing device 24 may calculate an actual centerline 50 of the current traffic lane 26, disposed between the left boundary lane indicator 40 and the right boundary lane indicator 42 of the current traffic lane 26, and maneuver the vehicle 20 to follow the actual centerline 50 of the current traffic lane 26. In other embodiments, the computing device 24 may control the vehicle 20 to prevent the vehicle 20 from crossing either of the left boundary lane indicator 40 or the right boundary lane indicator 42.

When the computing device 24 determines that at least one of the left boundary lane indicator 40 and the right boundary lane indicator 42 of the current traffic lane 26 is an unsatisfactory delineator of the current traffic lane 26, generally indicated at 128 in FIG. 2, and generally represented by line segments 44A and 44B in FIG. 1, then the computing device 24 analyzes the first boundary lane indicator 36 and the second boundary lane indicator 38 to determine if they are representative and generally parallel with the current traffic lane. The step of determining if the first boundary lane indicator 36 and the second boundary lane indicator 38 are representative of the current traffic lane 26 is generally indicated by box 130 in FIG. 2.

If the computing device 24 determines that the first boundary lane indicator 36 and the second boundary lane indicator are not representative of the current traffic lane, generally indicated at 136, then the computing device proceeds to transfer control of the vehicle 20 to the human operator. The step of transferring control of the vehicle 20 to the human operator is generally indicated by box 138 in FIG. 2.

If the computing device 24 determines that the first boundary lane indicator 36 and the second boundary lane indicator 38 are representative of the current traffic lane 26, generally indicated at 132, then the computing device proceeds to use the first boundary lane indicator 36 and the second boundary lane indicator 38 of the adjacent traffic lane 28 in order to control and maneuver the vehicle 20 to maintain a position of the vehicle 20 within the current traffic lane 26. The step of using the first boundary lane indicator 36 and the second boundary lane indicator 38 of the adjacent traffic lane to control the vehicle 20 is generally indicated by box 134 in FIG. 2. Accordingly, the computing device 24 uses sensed data related to the adjacent traffic lane 28 in order to maintain the position of the vehicle 20 within the current traffic lane 26. It should be appreciated that the computing device 24 may use the sensed data related to any of the available adjacent traffic lanes 28 shown in FIG. 1.

In order to use the first boundary lane indicator 36 and the second boundary lane indicator 38 of the adjacent traffic lane 28 as the basis for controlling the vehicle 20 within the current traffic lane 26, the computing device 24 may compare the first boundary lane indicator 36 and the second boundary lane indicator 38 to map data representing the adjacent traffic lane 28 and the current traffic lane 26, in order to identify a relative position between the adjacent traffic lane 28 and the current traffic lane 26. The map data representing the adjacent traffic lane 28 and the current traffic lane 26 may be stored in the memory 32 of the computing device 24, or may be referenced from a remote location through a wireless connection. The computing device 24 may compare the map data of the adjacent traffic lane 28 and the current traffic lane 26 to the sensed first boundary lane indicator 36 and the second boundary lane indicator 38 of the adjacent traffic lane 28, as well as the left boundary lane indicator 40 and the right boundary lane indicator 42 of the current traffic lane 26, in order to ensure that the first boundary lane indicator 36 and the second boundary lane indicator 38 of the adjacent traffic lane 28 substantially represent and mimic the current traffic lane 26. In other words, the computing device 24 determines if the first boundary lane indicator 36 and the second boundary lane indicator 38 follow substantially similar paths and/or maintain a substantially similar separation therebetween. If the computing device 24 determines that the adjacent traffic lane 28 is not representative of the current traffic lane 26, such as may occur if the adjacent traffic lane 28 veers away from the current traffic lane 26, then the computing device 24 transfers control of the vehicle 20 to a human operator of the vehicle 20. In contrast, if the computing device 24 determines that the adjacent traffic lane 28, as defined between the first boundary lane indicator 36 and the second boundary lane indicator 38, substantially follows the same path as the current traffic lane 26 and maintains a constant separation with the current traffic lane 26, such as with parallel lanes of a multi-lane roadway, then the computing device 24 proceeds to use the first boundary lane indicator 36 and the second boundary lane indicator 38 to control the vehicle 20.

The computing device 24 may control the vehicle 20 using the first boundary lane indicator 36 and the second boundary lane indicator 38 of the adjacent traffic lane 28 in a suitable manner. For example, the computing device 24 may transpose or laterally shift the first boundary lane indicator 36 of the adjacent traffic lane 28 onto the current traffic lane 26 to define a transposed left edge 52 of the current traffic lane 26, and transpose or shift the second boundary lane indicator 38 of the adjacent traffic lane 28 onto the current traffic lane 26 to define a transposed right edge 54 of the current traffic lane 26. The transposed left edge 52 approximates the left boundary lane indicator 40 of the current traffic lane 26, whereas the transposed right edge 54 approximates the right boundary lane indicator 42 of the current traffic lane 26. The computing device 24 may sense, measure, or otherwise determine the distance separating corresponding features of the adjacent traffic lane 28 and the current traffic lane 26, and use that distance to transpose or shift the first boundary lane indicator 36 and the second boundary lane indicator 38 into the current traffic lane 26 to define the transposed left edge 52 and the transposed right edge 54 of the current traffic lane 26 respectively. For example, if a center of the adjacent traffic lane 28 is twelve feet from a center of the current traffic lane 26, then the computing device 24 may transpose or shift the first boundary lane indicator 36 and the second boundary lane indicator 38 twelve feet to define the transposed left edge 52 and the transposed right edge 54 of the current traffic lane 26. While the transposed left edge 52 and the transposed right edge 54 are shown slightly offset for clarity from the unsatisfactory delineated sections of the left boundary lane indicator 40 and the right boundary lane indicator 42 of the current traffic lane 26 respectively, it should be appreciated that the transposed left edge 52 and the un-satisfactorily delineated segment 44A of the left boundary lane indicator 40 will substantially overlap each other, and that the transposed right edge 54 and the un-satisfactorily delineated segment 44B of the right boundary lane indicator 42 will substantially overlap each other.

If the computing device 24 has not previously determined that the first boundary lane indicator 36 and the second boundary lane indicator 38 of the adjacent traffic lane 28 are substantially parallel the left boundary lane indicator 40 and the right boundary lane indicator 42 of the current traffic lane 26, as described above, then the computing device 24 may compare the transposed right edge 54 of the current traffic lane 26 and the transposed left edge 52 of the current traffic lane 26 to a current travel path 56 of the vehicle 20 in order to determine if the transposed right edge 54 and the transposed left edge 52 of the current traffic lane 26 are generally aligned with the current travel path 56 of the vehicle 20. If the transposed left edge 52 and the transposed right edge 54 are generally aligned with the current travel path 56 of the vehicle 20, then the computing device 24 may proceed to control the vehicle 20 using the transposed left edge 52 and the transposed right edge 54. In contrast, if the computing device 24 determines that the transposed left edge 52 and the transposed right edge 54 do not generally align with the current travel path 56 of the vehicle 20, then the computing device 24 may transfer control of the vehicle 20 to the human operator.

When the computing device 24 determines that the transposed left edge 52 and the transposed right edge 54 are aligned with the current traffic lane 26, then the computing device 24 may proceed to control and maneuver the vehicle 20 to maintain the position of the vehicle 20 within the current traffic lane 26 using the transposed left edge 52, obtained from the first boundary lane indicator 36 of the adjacent traffic lane 28, and the transposed right edge 54, obtained from the second boundary lane indicator 38 of the adjacent traffic lane 28.

The computing device 24 may use the transposed left edge 52 and the transposed right edge 54 of the current traffic lane 26 as the basis for maneuvering the vehicle 20 in a suitable manner. For example, the computing device 24 may control and/or maneuver the vehicle 20 so that the vehicle 20 does not cross either of the transposed left edge 52 or the transposed right edge 54. Alternatively, the computing device 24 may calculate a transposed centerline 58. The transposed centerline 58 is a centerline that is disposed midway between the transposed left edge 52 and the transposed right edge 54. The transposed centerline 58 approximates the actual centerline 50 of the current traffic lane 26. Optionally, the computing device 24 may compare the transposed centerline 58 to the current travel path 56 of the vehicle 20 to determine if the transposed centerline 58 and the current travel path 56 of the vehicle 20 are generally aligned. If the transposed centerline 58 and the current travel path 56 of the vehicle 20 are generally aligned, then the computing device 24 may control and/or maneuver the vehicle 20 to follow the transposed centerline 58. If the transposed centerline 58 and the current travel path 56 of the vehicle 20 are not generally aligned, then the computing device 24 may transfer control of the vehicle 20 to the human operator.

The computing device 24 may use the first boundary lane indicator 36 and the second boundary lane indicator 38 as the basis for controlling and/or maneuvering the vehicle 20 in other manners as well. For example, the computing device 24 may calculate an actual centerline 60 of the adjacent traffic lane 28. The actual centerline 60 of the adjacent traffic lane 28 is disposed midway between the first boundary lane indicator 36 and the second boundary lane indicator 38. The computing device 24 may then transpose or shift the actual centerline 60 of the adjacent traffic lane 28 onto the current traffic lane 26 to define the transposed centerline 58, and control and/or maneuver the vehicle 20 to follow the transposed centerline 58 as described above.

The above described process may be used to control the vehicle 20 when the left boundary lane indicator 40 and/or the right boundary lane indicator 42 are unsatisfactory delineators of the current traffic lane 26. Upon the computing device 24 re-establishing that the left boundary lane indicator 40 and the right boundary lane indicator 42 are once again satisfactory delineators of the current traffic lane 26, the computing device 24 may proceed and control the vehicle 20 based on the left boundary lane indicator 40 and the right boundary lane indicator 42 of the current traffic lane 26.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of controlling a vehicle, the method comprising:
    sensing a first boundary lane indicator and a second boundary lane indicator of an adjacent traffic lane, with at least one sensor of the vehicle, wherein the adjacent traffic lane is laterally offset from a current traffic lane of the vehicle;
    transposing the first boundary lane indicator of the adjacent traffic lane onto the current traffic lane to define a transposed left edge, and transposing the second boundary lane indicator of the adjacent traffic lane onto the current traffic lane to define a transposed right edge; and
    maneuvering the vehicle, with a computing device of the vehicle, to maintain a position of the vehicle within the current traffic lane, based on the sensed first boundary lane indicator and the sensed second boundary lane indicator of the adjacent traffic lane.

2. The method set forth in claim 1, further comprising sensing a left boundary lane indicator and a right boundary lane indicator of the current traffic lane, with the at least one sensor of the vehicle.

3. The method set forth in claim 2, further comprising determining that both of the left boundary lane indicator and the right boundary lane indicator of the current traffic lane are satisfactory delineators of the current traffic lane, or that at least one of the left boundary lane indicator and the right boundary lane indicator of the current traffic lane is an unsatisfactory delineator of the current traffic lane.

4. The method set forth in claim 3, wherein maneuvering the vehicle to maintain the position of the vehicle within the current traffic lane based on the sensed first boundary lane indicator and the sensed second boundary lane indicator of the adjacent traffic lane, is further defined as maneuvering the vehicle to maintain the position of the vehicle within the current traffic lane based on the sensed first boundary lane indicator and the sensed second boundary lane indicator of the adjacent traffic lane when at least one of the left boundary lane indicator and the right boundary lane indicator of the current traffic lane is determined to be an unsatisfactory delineator of the current traffic lane.

5. The method set forth in claim 2, further comprising maneuvering the vehicle, with the computing device of the vehicle, to maintain a position of the vehicle within the current traffic lane, based on the left boundary lane indicator and the right boundary lane indicator of the current traffic lane, when both of the left boundary lane indicator and the right boundary lane indicator of the current traffic lane are determined to be satisfactory delineators of the current traffic lane.

6. The method set forth in claim 1, further comprising calculating a transposed centerline of the current traffic lane disposed between the transposed left edge and the transposed right edge.

7. The method set forth in claim 6, wherein maneuvering the vehicle to maintain the position of the vehicle within the current traffic lane based on the sensed first boundary lane indicator and the sensed second boundary lane indicator of the adjacent traffic lane, is further defined as maneuvering the vehicle to follow the transposed centerline.

8. The method set forth in claim 6, further comprising comparing the transposed centerline to a current travel path of the vehicle to determine if the transposed centerline and the current travel path of the vehicle are aligned.

9. The method set forth in claim 6, wherein maneuvering the vehicle to maintain the position of the vehicle within the current traffic lane based on the sensed first boundary lane indicator and the sensed second boundary lane indicator of the adjacent traffic lane, is further defined as maneuvering the vehicle so that the vehicle does not cross either of the transposed left edge or the transposed right edge.

10. The method set forth in claim 1, further comprising calculating an actual centerline of the adjacent traffic lane between the first boundary lane indicator and the second boundary lane indicator.

11. The method set forth in claim 10, further comprising transposing the actual centerline of the adjacent traffic lane onto the current traffic lane to define a transposed centerline.

12. The method set forth in claim 1, wherein the at least one sensor of the vehicle includes at least one of a LIDAR sensor or a camera.

13. The method set forth in claim 1, further comprising comparing the first boundary lane indicator and the second boundary lane indicator to map data representing the adjacent traffic lane and the current traffic lane to identify a relative position between the adjacent traffic lane and the current traffic lane.

14. A vehicle comprising:
at least one sensor operable to sense boundary lane indicators of a current traffic lane and an adjacent traffic lane of the vehicle, wherein the adjacent traffic lane is laterally offset from the current traffic lane of the vehicle;
a computing device in communication with the at least one sensor, the computing device including a processor and a memory having a lane boundary determination algorithm stored therein, wherein the processor is operable to execute the lane boundary determination algorithm to:
sense a first boundary lane indicator and a second boundary lane indicator of the adjacent traffic lane;
transpose the first boundary lane indicator of the adjacent traffic lane onto the current traffic lane to define a transposed left edge of the current traffic lane;
transpose the second boundary lane indicator of the adjacent traffic lane onto the current traffic lane to define a transposed right edge of the current traffic lane; and
calculate a transposed centerline of the current traffic lane disposed between the transposed left edge and the transposed right edge; and
maneuver the vehicle to maintain a position of the vehicle within the current traffic lane, based on the sensed first boundary lane indicator and the sensed second boundary lane indicator of the adjacent traffic lane.

15. The vehicle set forth in claim 14, wherein the processor is operable to execute the lane boundary determination algorithm to sense a left boundary lane indicator and a right boundary lane indicator of the current traffic lane of the vehicle.

16. The vehicle set forth in claim 15, wherein the processor is operable to execute the lane boundary determination algorithm to determine that both of the left boundary lane indicator and the right boundary lane indicator of the current traffic lane are satisfactory delineators of the current traffic lane, or determine that at least one of the left boundary lane indicator and the right boundary lane indicator of the current traffic lane is an unsatisfactory delineator of the current traffic lane.

17. The vehicle set forth in claim 16, wherein the processor is operable to execute the lane boundary determination algorithm to maneuver the vehicle to maintain the position of the vehicle within the current traffic lane, based on the sensed first boundary lane indicator and the sensed second boundary lane indicator of the adjacent traffic lane, when at least one of the left boundary lane indicator and the right boundary lane indicator of the current traffic lane is determined to be an unsatisfactory delineator of the current traffic lane.

18. The vehicle set forth in claim 16, wherein the processor is operable to execute the lane boundary determination algorithm to maneuver the vehicle to maintain the position of the vehicle within the current traffic lane, based on the left boundary lane indicator and the right boundary lane indicator of the current traffic lane, when both of the left boundary lane indicator and the right boundary lane indicator of the current traffic lane are determined to be satisfactory delineators of the current traffic lane.

19. The vehicle set forth in claim 14, wherein the processor is operable to execute the lane boundary determination algorithm to
maneuver the vehicle to maintain the position of the vehicle within the current traffic lane based on the sensed first boundary lane indicator and the sensed second boundary lane indicator of the adjacent traffic lane so that the vehicle does not cross either of the transposed left edge or the transposed right edge.

* * * * *